W. G. Brower,

Elevator,

№ 1,990, Reissued June 13, 1865.

UNITED STATES PATENT OFFICE.

WILLIAM G. BROWER, OF NEW BRUNSWICK, NEW JERSEY.

IMPROVEMENT IN HOISTING-MACHINES.

Specification forming part of Letters Patent No. 20,322, dated May 25, 1858; Reissue No. 1,990, dated June 13, 1865.

*To all whom it may concern:*

Be it known that I, WILLIAM G. BROWER, of New Brunswick, in the county of Middlesex and State of New Jersey, have invented a new and useful Improvement in Hoisting-Machines; and I do hereby declare that the following is a full, clear, and exact description thereof, which will enable those skilled in the art to make and use the same, reference being had to the accompanying drawings, forming part of this specification, in which—

Figure 1:
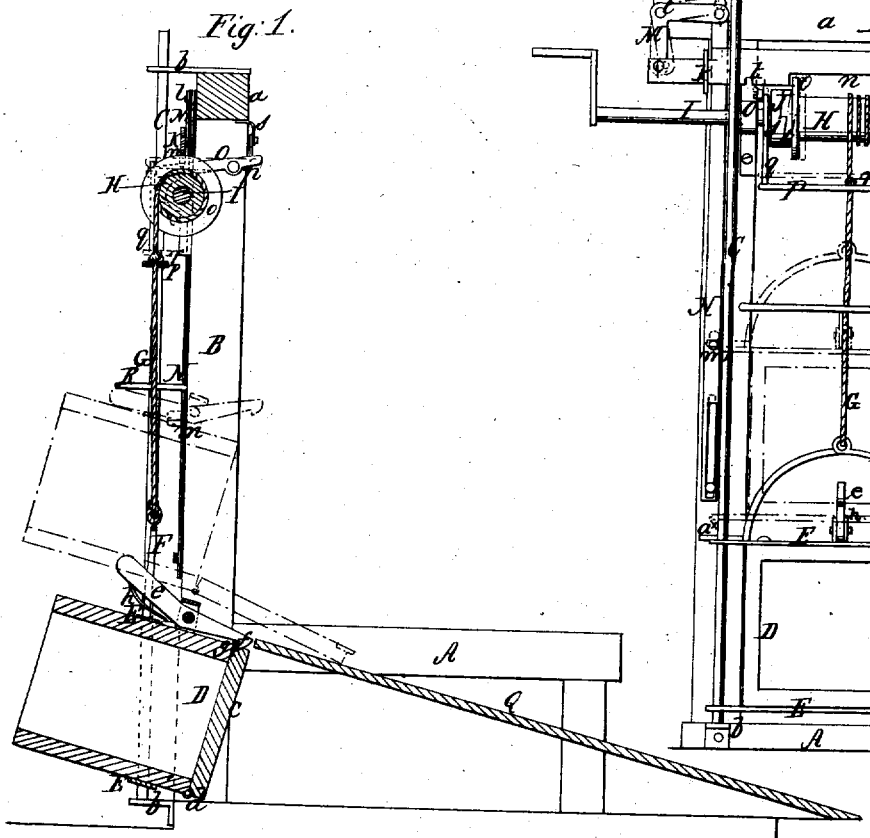
Figure 2:
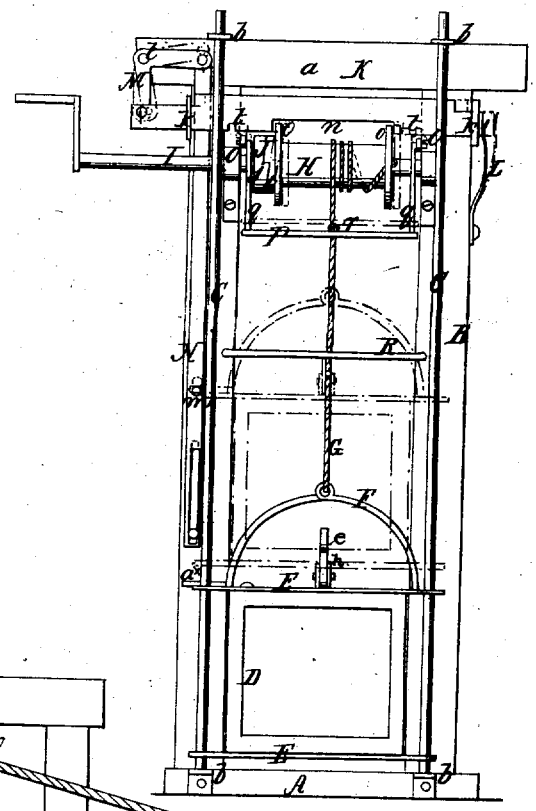

Figure 1 represents an elevation of a vertical cross-section of a machine made according to my invention. Fig. 2 is a front elevation of the machine.

Similar letters of reference indicate corresponding parts.

This invention relates to machines or apparatus for hoisting ice and other articles; and it consists, in general terms, in such a construction and combination of parts that both the delivery of the articles hoisted and the changes of those parts by which the hoisting is done are effected in an automatic manner by a continuous application of the driving-power.

To enable those skilled in the art to fully understand and construct my invention, I will proceed to describe it.

A represents a framing, which may be constructed in any proper way; and B B are two uprights attached to said framing, the upper ends of the uprights being connected by a cross-piece, *a*. To each upright B a vertical guide-rod, C, is attached, said rods being secured in arms *b*, which project from the lower and upper ends of each upright.

D is a box, which is fitted in an inclined position between two parallel and horizontal bars, E E, said bars being fitted on the guide-rods C and allowed to slide freely up and down them. The back end of the box D is provided with a door or lap, *c*, the lower end of which is hinged to the bottom of the box, as shown at *d*, and the upper end of the door or lap is secured to the box by a catch, which is a simple lever, *e*, having a shoulder, *f*, at one end, which is made to catch over a projection, *g*, on the upper edge of the door or flap by a spring, *h*, which bears or presses upward against the under side of the opposite end of the lever *e*. To the upper bar, E, a bail, F, is attached, and one end of a chain or rope, G, is attached to said bail, the opposite end of the chain or rope being attached to a drum, H, which is placed loosely on a shaft, I, said shaft having its bearings at the upper part of the uprights B B.

J is an ordinary slide-clutch or coupling, one part, *i*, of which is formed at one end of the drum H, the other part, *j*, being permanently secured to the shaft I opposite the part *i*.

K is a horizontal shifting-bar, which is fitted in guides *k k*, attached one to each upright B. The bar K is allowed to slide longitudinally in the guide *k*, and a spring, L, which is attached to one of the uprights B, bears against one end of the bar K. The opposite end of the bar K is pivoted to one end of a bent lever, M, which is attached to the cross-piece *a* by a fulcrum-pin, *l*, and the opposite end of the lever is pivoted to the upper end of a vertical sliding bar, N, which is attached to one of the uprights B, and has a pin, *m*, projecting from it horizontally outward. The lower edge of the bar K has a recess, *n*, made in it, and flanges *o*, at each end of the drum H, fit within this recess. (See Fig. 2.)

O O are two levers, which are attached by fulcrum-pins *p* to each inner side of the uprights B, one to each. The front ends of these levers have each a pendent rod, *q*, attached, and the lower ends of the rods are attached to a horizontal bar, P, which is slotted to allow the chain or rope G to pass through said chain or rope, having a knot or stop, *r*, on it, the use of which will be presently explained. On the back end of each lever O a spring, *s*, bears, said springs having a tendency to keep the front ends of the levers O up against the bar K, which bar has notches *t* made in it to receive said levers at a certain time, as will be presently explained.

Q is a chute the upper or elevated end of which is on a level with or just below the bottom of box D when said box is elevated. This chute may lead into the store-house or other place where the ice or other article or goods hoisted are to be delivered.

R is a rod, which projects out from the uprights B B, to actuate the lever *e* at the proper time.

The operation is as follows: The machine may be placed near the store-house to be filled, and adjoining the pond or river from which the ice is cut, if the machine is to be used for hoisting ice, or adjoining the deposit of any other article or goods which it is desired to hoist. A continuous rotary motion is given the shaft I by any proper means. The article to be hoisted is placed in the box D, and when said box is down at the lower end of the machine the clutch J will be in gear. The drum H will consequently be rotated with shaft I and the box D elevated, and when at a certain heighth the end of lever *e* will strike against the rod R, and, the door *c* being released thereby, it will open by its own gravity and allow the article, which also passes out of the box owing to the inclination of the same, to pass out upon and down the chute Q into any proper receptacle. Immediately after the opening of the door *c* and the discharge of the article hoisted a projecting bar, $a^{\times}$, on the top of the box D, strikes the pin *m* and actuates the bar N, which, through the medium of the bent lever M, slides the bar K, and consequently the drum H, on its shaft, so that the part *i* of the clutch will be thrown out of gear with the part *j*, and the box D will then instantly descend by its own gravity to be refilled, the door *c* being closed by the upper end of the chute as the box descends. When the bar K is moved to disengage the clutch J, it is held by the levers O until the box has reached its lowest point, the front parts of the levers being thrown into the notches *t* by the springs *s*. The shaft I is kept rotating, but as the drum H is not connected with it the box D remains below; but as the box is filled the weight within it causes the knot or stop *r* to draw down the bar P, and, consequently, the levers O will pass out of the notches *t*, and the spring L will throw the clutch in gear and the box will be again elevated, its contents discharged, and the operation repeated.

I would remark that the weight of the box D may also cause the knot or stop *r* to actuate the bar P at once, or as soon as the box D reaches its lowest point, the momentum of drum H causing a sufficient quantity of chain or rope to pass off or unwind from it, so as to allow time for the box to be loaded before it commences to ascend.

I do not wish to confine myself to the use of a box in connection with my improvement; but any proper platform or apparatus capable of receiving or holding or being attached to the article to be hoisted may be substituted for such box without departing from or altering the principle of my invention; nor do I wish to confine myself to the precise construction of coupling here shown, since the drum H may be arranged to have only rotary motion and the coupling on the shaft be made to slide up to and away from the end of the drum.

I claim as new and desire to secure by Letters Patent—

1. The combination, in a machine for hoisting, of a coupling, J, or its equivalent, for connecting and disconnecting the driving-power to and from the windlass, with the sliding bars K N, levers O O, substantially as and for the purpose above described.

2. The devices mentioned in the preceding clause of the claims, in combination with means for holding the article to be raised, subst tially as and for the purpose above described.

3. Withdrawing the levers O O from their engagement with the shifting-bar K by means of the hoisting rope or chain and the cross-bar P and rods *q*, or their equivalents, so as to connect the windlass with the driving-power by means of the descent or weight of the rope or chain, and its attachments, substantially as above described.

WILLIAM G. BROWER.

Witnesses:
GEORGE C. LUDLOW,
MARTIN NEVINS.